United States Patent [19]
Bezzecchi

[11] 3,843,029
[45] Oct. 22, 1974

[54] SPREADING SPOUT FOR FERTILIZER SPREADING MACHINES OF THE SWINGING TUBE TYPE

[76] Inventor: Carlo Bezzecchi, 3, Via dei Tigli, Campagnola, Italy 42012

[22] Filed: July 23, 1973

[21] Appl. No.: 381,663

[30] Foreign Application Priority Data
Aug. 9, 1972 Italy.................................. 46906/72

[52] U.S. Cl.................. 222/533, 222/566, 239/523
[51] Int. Cl............................................. A01c 15/00
[58] Field of Search ............ 222/575, 533, 461, 566; 239/689, 688, 652, 654, 523; 302/4, 61, 63

[56] References Cited
UNITED STATES PATENTS
1,274,969  8/1918  Wirt.............................. 239/652 X
2,921,488  1/1960  Davis............................. 239/523 X Primary Examiner—Allen N. Knowles
Assistant Examiner—John P. Shannon
Attorney, Agent, or Firm—Brisebois & Kruger

[57] ABSTRACT

Spreading spout for fertilizer spreading machine consists of a shell shaped body with a concave base, provided with upwardly inclined peripheral walls; the concave base has a isosceles trapezoidal form in plan view and its shorter base engages the central delivery hole of the spreading spout at the minor base of said trapezium.

5 Claims, 7 Drawing Figures

3,843,029

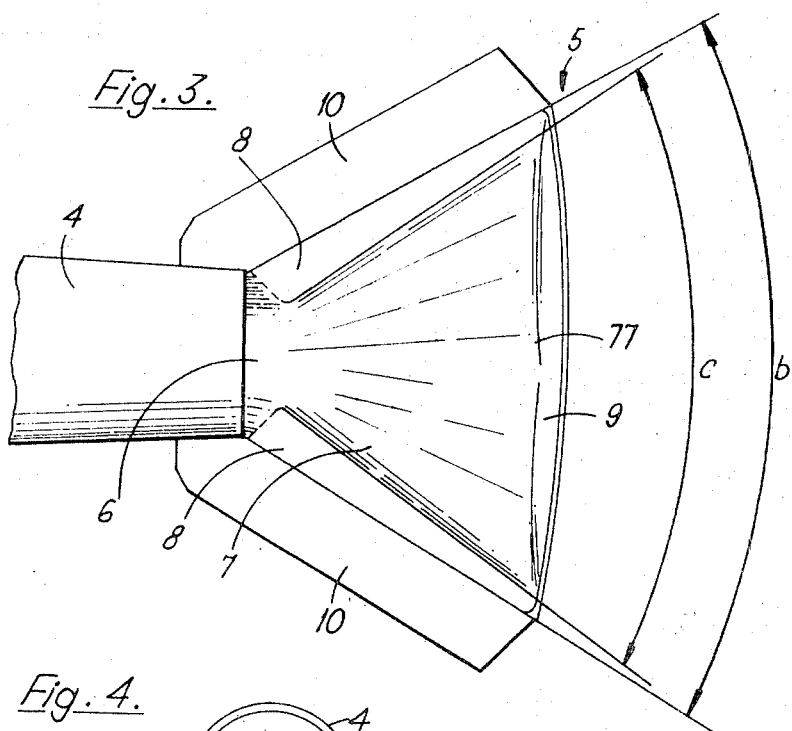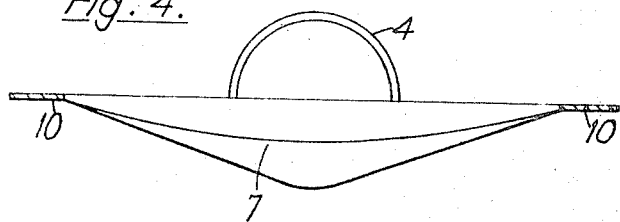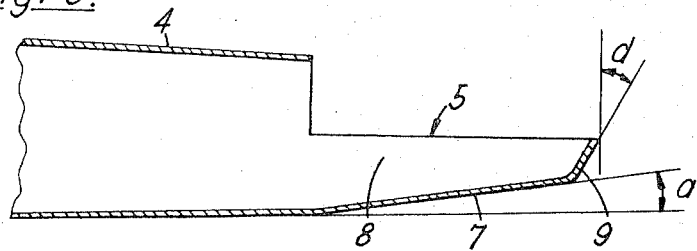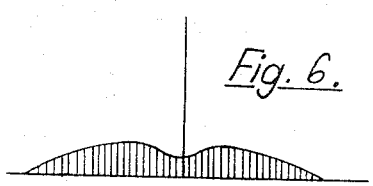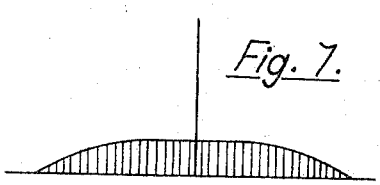

SPREADING SPOUT FOR FERTILIZER SPREADING MACHINES OF THE SWINGING TUBE TYPE

SUMMARY OF THE INVENTION

Fertilizer spreading machines have been known for some time which comprise a hopper for containing the granular or powdery material to be spread, under which there is a 90° elbow from which extends a substantially horizontal conical tube, both the elbow and the conical tube being driven in a reciprocating swinging movement by suitable kinematic means.

One of the problems which arise during the operation of fertilizer spreading machines of the type heretofore described concerns the uniformity of spreading.

In fact, the spreading of the fertilizer takes place over a determined area in parallel strips, each of which is formed during a straight run of the machine.

It is thus necessary for each strip to have constant uniformity at least in the central zone, with a uniform gradation at the edges, so as to give a resulting uniform distribution by the partial overlapping of two adjacent strips.

To this end, known machines provide at the end of the swinging tube various special arrangements or devices for guaranteeing a uniformity of spreading of the material thrown on to the ground, but which however do not obtain the desired object.

In fact, the material leaves the tube through centrifugal force which, as the motion of the tube is not uniform, is not constant.

Moreover the outflow of the material is influenced by the transverse acceleration of the tube, which keeps the material heaped against the tube walls.

The most improved devices give a spread which, far from being constant, for the aforementioned reason give a lower fertilizer density in the central zone over the axis of forward movement of the machine, and a non-linear variation of density at the edges of the strip concerned.

All known attempts to improve this situation involve the application to the end of the tube of one or more screening gates inside or outside the tube, and the formation, close to the central outlet mouth of the tube, of a plurality of holes in the tube walls.

The present invention relates to a swinging tube of a particular shape, characterized in that it comprises at its end a type of shovel extending along the axis of the tube, slightly diverging and open upwards, which enables surprisingly uniform results to be obtained, which are the reverse of the sampling diagrams of distribution intensity known up to the present time.

With the device according to the invention, an approximately linear distribution diagram can be obtained for the entire strip concerned with the spreading, the quantity deposited decreasing symmetrically and linearly at the edges of the strip so that by partial overlap of the strips concerned in the distribution, a uniform covering of material can be obtained over the entire area of fertilization.

The merits and functional and constructional characteristics of the invention will be more evident from the detailed description given hereinafter relating to a particular embodiment of the invention with reference to the accompanying drawings in which:

FIG. 3 is a plan view of the end of the swinging tube according to the invention;

FIG. 4 is a front view of the device according to the invention;

FIG. 5 is a section taken along the line V—V of FIG. 3;

FIG. 6 is a qualitative diagram showing the distribution density obtained with known devices; and FIG. 7 is a diagram of the same type for the device according to the invention.

Figure 1:
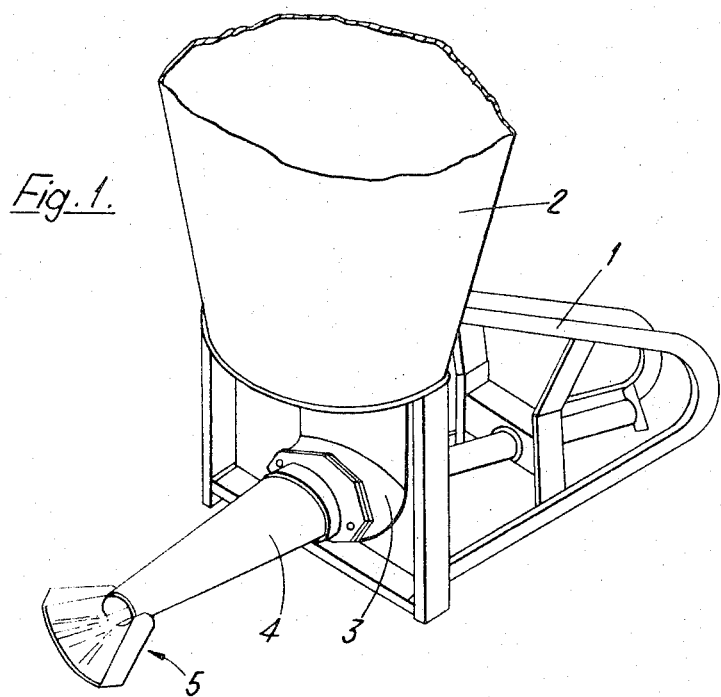
FIG. 1 is a perspective view of a distributing machine of the type to which the device according to the invention ca be applied.
Figure 2:
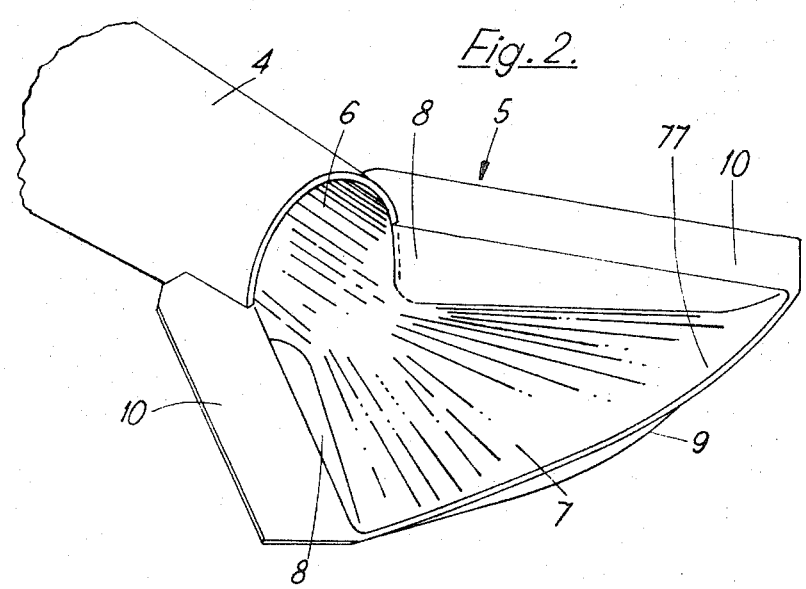
FIG. 2 is a perspective view of the device according to the invention.

The horizontal axes of said diagrams indicate the width of the strip concerned with the spreading, and the vertical axes indicate the unit spreading density.

They remain nearly unvaried for any rate of delivery of the material.

The aforementioned figures show the spreading machine consisting of a frame 1 for attachment, for example, to the rear power lift of a usual agricultural tractor, said frame 1 supporting an upper fixed hopper 2 under which there is a 90° elbow 3 which swings alternately to right and left and is attached to the spreading tube 4 the end of which is shaped in accordance with the invention. Said end 5 consists of shell of suitable material, which may be made in one piece with the spreading tube and which, in the most convenient proportions, comprises a mouth 6 of width equal to the diameter of the spreading tube, and which is associated with the lower half of the outlet of said tube.

Said mouth widens in a forward direction to form said shell, with the cavity facing upwards.

Said shell has an upper edge lying substantially in the diametral plane of the swinging spreading tube or spout.

The shell comprises a bottom 7 of isosceles trapezoidal having a, slightly concave upper surface but substantially flat, and which rises upwards slightly toward the edge remote from its mouth.

Its inclination is defined by an angle a, the value of which lies between 8° and 12°.

The major base 77 of the shell is slightly rounded in the horizontal direction in the form of an arc of a circle.

The angle b of divergence between the tops of the two inclined sides lies between 65° and 75°, according to one convenient design.

The minor base 177 is curved in the vertical direction so as to accompany the mouth 6 of diameter substantially equal to that of the outlet of the tube or spout.

The three free sides of said base extend upwards in the form of three rims joined at their edges in a rounded connection.

The two ideal connection lines between the two lateral rims 8 and the base converge substantially towards the vertical diametrical plane of the tube outlet, and diverge by an angle c between 70° and 80°.

The frontal rim 9 is uniformly inclined to the vertical by an angle d between 25° and 35°.

Moreover the two connection lines between the base and rims 8 are inclined upwards by an angle between 18° and 22°.

There are also two substantially horizontal plates 10, for strenghtening the lateral rims 8.

With an embodiment of the type heretofore described, a spreading diagram is obtained of the type shown in FIG. 7, which is a considerable improvement on the qualitative spreading diagram shown in FIG. 6, relating to known spreading means.

The width of uniform spreading obtained by the device heretofore described for a forward speed of approximately 10/Km./hour of the vehicle and a swing frequency of the tube of about 540 complete cycles per minute is about 9 meters.

At the sides of the said 9 meter uniform spreading strip there are two zones in which the spreading density decreases linearly to zero, each of which is about 1.80 meters wide.

In this manner by superimposing two of said zones in which the decrease in the spreading density is linear, a continuous uniform covering is obtained with a density equal to that of the central section, thus enabling excellent results to be obtained in spreading any type of fertilizer.

The invention is not limited to the single embodiment heretofore described, and modifications and improvements may be made to it without departing from the scope of the invention, the fundamental characteristics of which are summarized in the following claims.

What we claim is:

1. In a particle spreader comprising a hopper, an outlet duct for said hopper mounted for swinging motion in a substantially horizontal plane, and a spreading spout fixed to the outlet end of said outlet duct, the improvement according to which said spout fans outwardly from said duct in a substantially horizontal direction and is provided with a bottom which is concave as seen from above and rims at the sides of said bottom and at the end thereof remote from said duct, which rims slope upward at an angle to said bottom.

2. A spreader as claimed in claim 1 in which the bottom of said spout is symmetrical about a vertical plane extending through the center of the outlet end of said outlet duct, and slopes upwardly away from the intersection between said plane and said bottom toward each side of said spout.

3. A spreader as claimed in claim 2 in which the bottom of said spout slopes upwardly from a point near said outlet duct to the edge of said spout remote therefrom at an angle of 8°–12° to the horizontal.

4. A spreader as claimed in claim 1 in which the rims at the sides of said spout diverge at an angle of from 70°–80° at their bottoms and from 65°–75° at their tops.

5. A spreader as claimed in claim 4 in which the rim at the edge of said spreader remote from said outlet duct lies at an angle of 25°–35° to the vertical.

* * * * *